(12) United States Patent
Taniguchi

(10) Patent No.: US 8,487,497 B2
(45) Date of Patent: Jul. 16, 2013

(54) MOTOR SYSTEM

(75) Inventor: Makoto Taniguchi, Obu (JP)

(73) Assignee: Denso Corporation, Kariya (JP)

( * ) Notice: Subject to any disclaimer, the term of this patent is extended or adjusted under 35 U.S.C. 154(b) by 102 days.

(21) Appl. No.: 13/313,208

(22) Filed: Dec. 7, 2011

(65) Prior Publication Data

US 2012/0139380 A1 Jun. 7, 2012

(30) Foreign Application Priority Data

Dec. 7, 2010 (JP) ................................. 2010-272206

(51) Int. Cl.
*H02K 1/00* (2006.01)

(52) U.S. Cl.
USPC .......................................... 310/179; 310/184

(58) Field of Classification Search
USPC .................... 310/179, 180, 184, 198
See application file for complete search history.

(56) References Cited

U.S. PATENT DOCUMENTS

| 6,630,804 | B2 * | 10/2003 | Moriya et al. | 318/85 |
| 7,518,279 | B2 * | 4/2009 | Chakrabarti et al. | 310/180 |
| 8,264,114 | B2 * | 9/2012 | Taniguchi et al. | 310/184 |
| 8,299,674 | B2 * | 10/2012 | Tanaka et al. | 310/184 |

FOREIGN PATENT DOCUMENTS

JP 2004-357489 12/2004

* cited by examiner

*Primary Examiner* — Nguyen N Hanh

(74) *Attorney, Agent, or Firm* — Nixon & Vanderhye PC

(57) ABSTRACT

In a motor system, a motor includes a rotor and a stator. The rotor includes magnet poles and consequent poles. The stator includes a stator core and a stator coil that is comprised of first and second m-phase coils. The number of slots of the stator core provided per circumferentially-adjacent pair of the magnet and consequent poles is equal to 4m. The phase windings of the first m-phase coil are alternately arranged with those of the second m-phase coil in a circumferential direction of the stator core. An inverter energizes the first and second m-phase coils to cause them to respectively create first and second spatial magnetic fluxes. Variation in a resultant spatial magnetic flux, which is the resultant of the first and second spatial magnetic fluxes, is less than variations in the first and second spatial magnetic fluxes in a circumferential direction of the rotor.

8 Claims, 9 Drawing Sheets

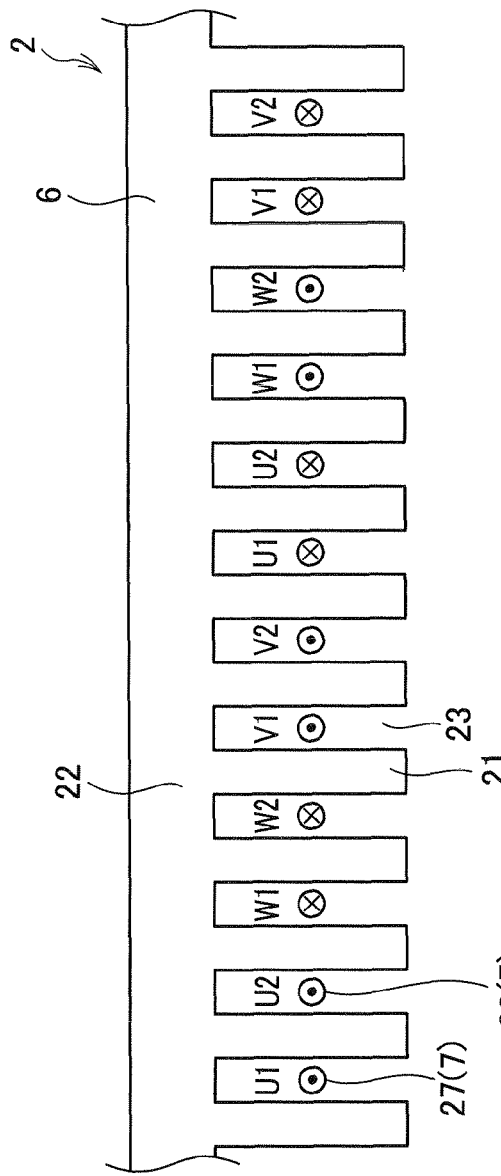
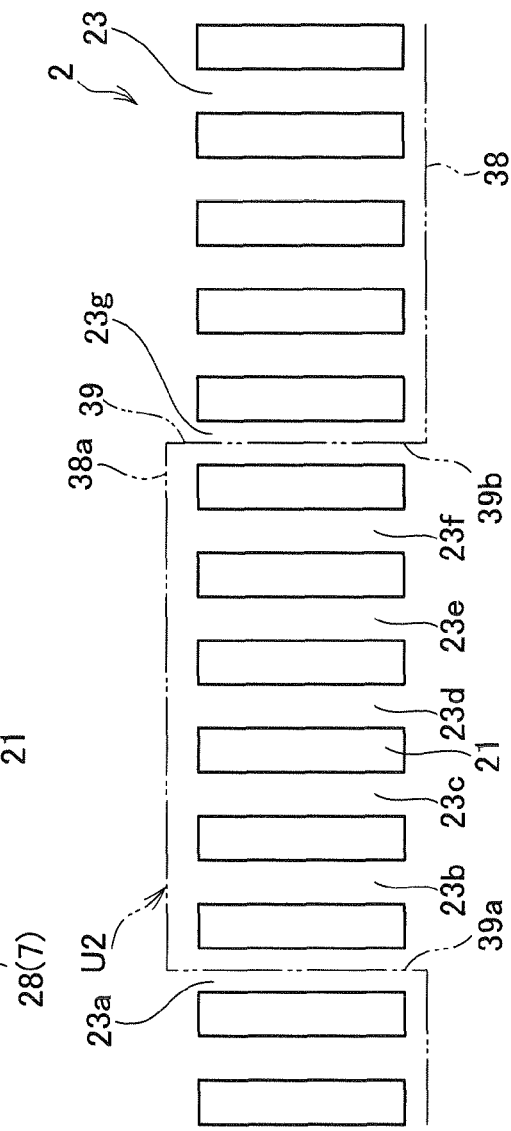
FIG.3A
FIG.3B

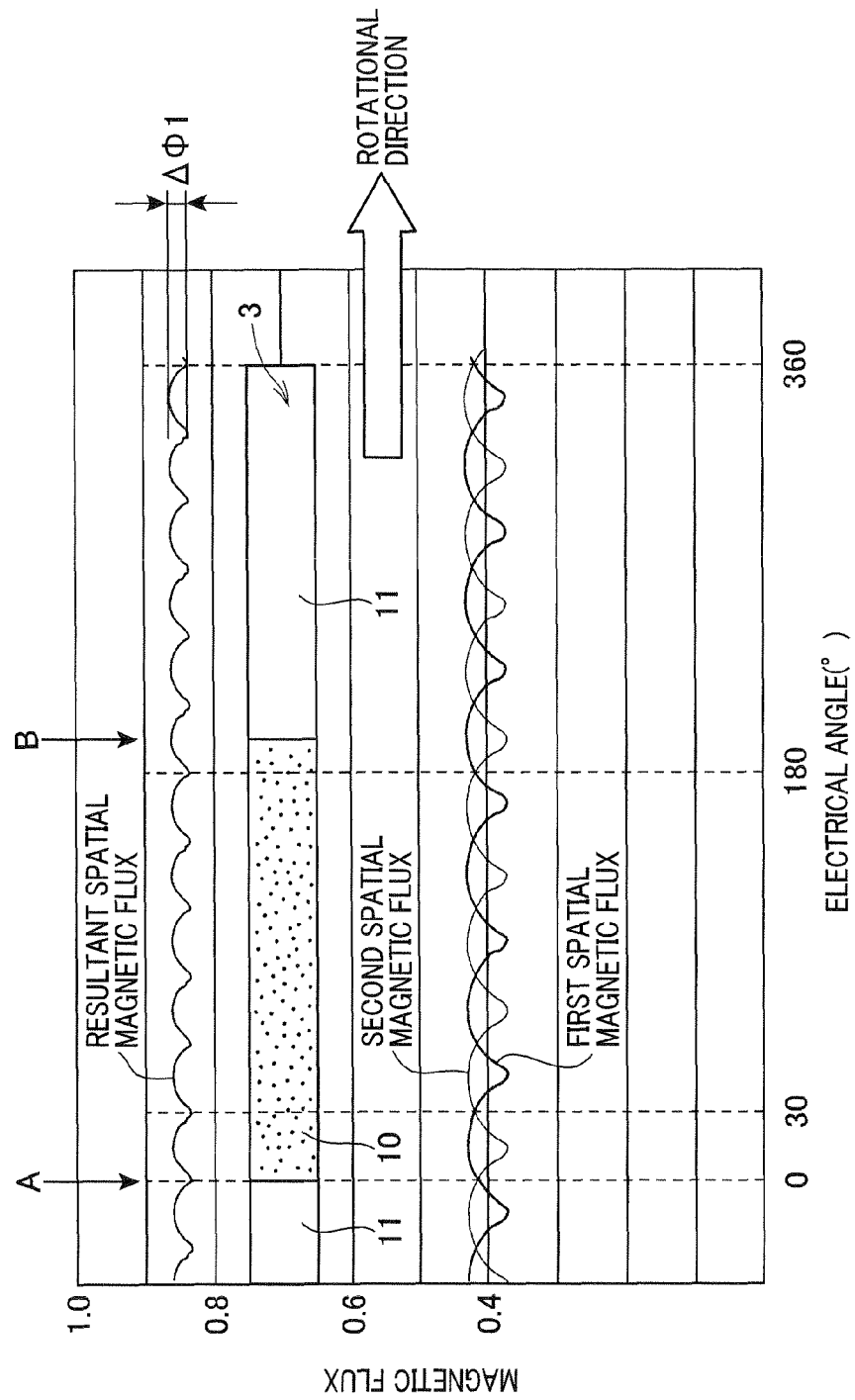

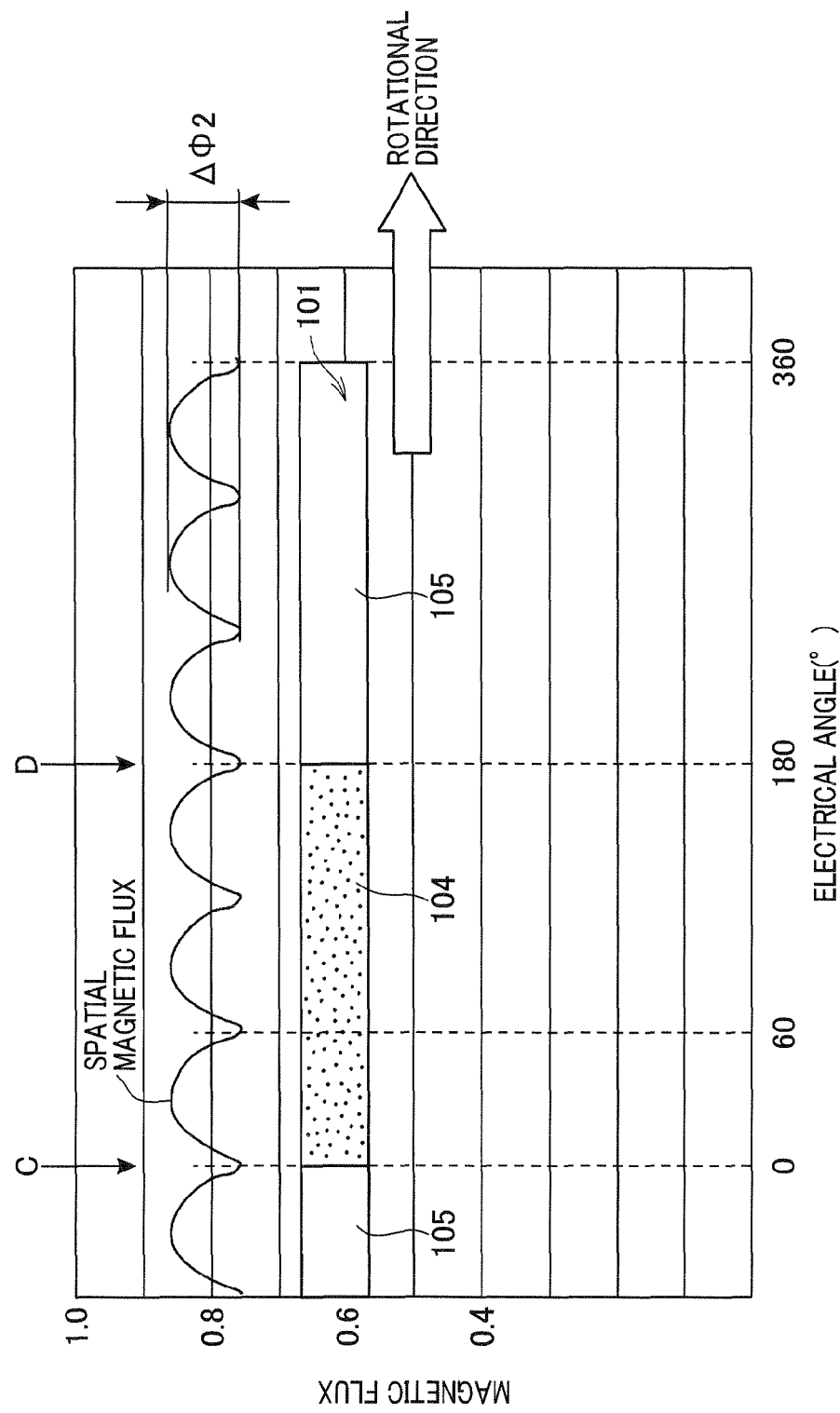

(FIRST EMBODIMENT)

(COMPARATIVE EXAMPLE)

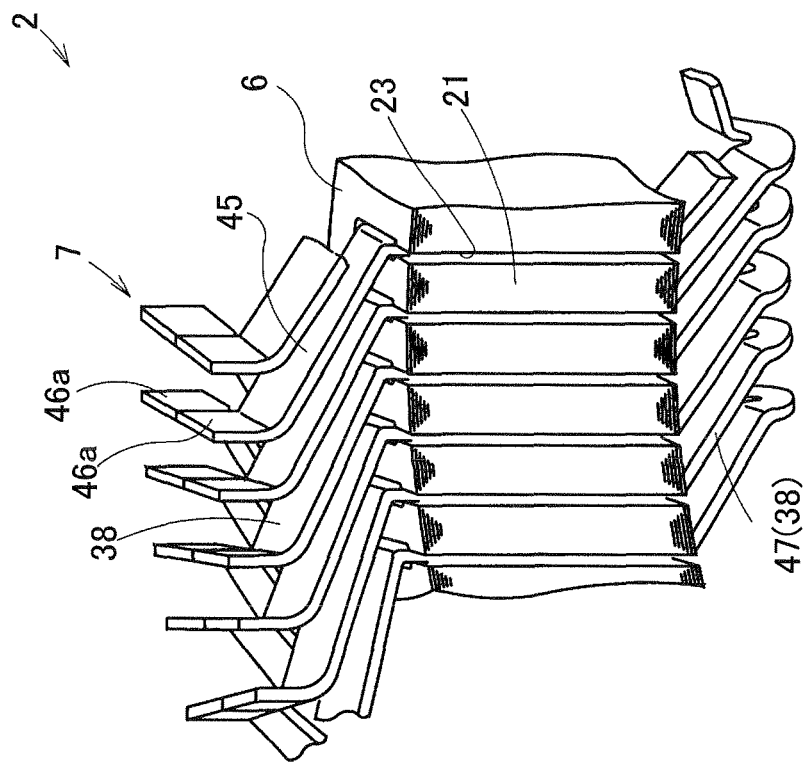
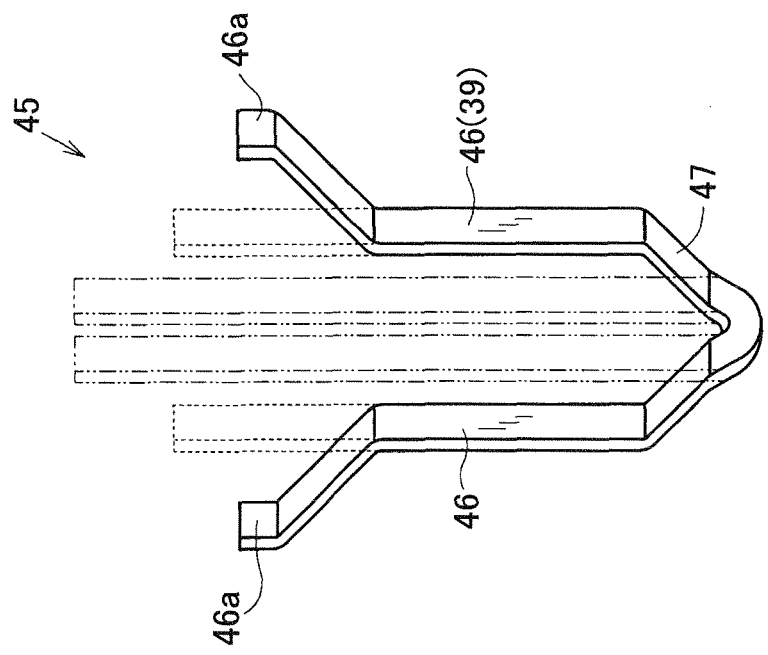

MOTOR SYSTEM

CROSS-REFERENCE TO RELATED APPLICATIONS

This application is based on and claims priority from Japanese Patent Application No. 2010-272206, filed on Dec. 7, 2010, the content of which is hereby incorporated by reference in its entirety into this application.

BACKGROUND OF THE INVENTION

1. Technical Field of the Invention

The present invention relates to motor systems that are used in, for example, hybrid vehicles and electric vehicles. In addition, the invention can also be applied to industrial machines and household electrical appliances.

2. Description of the Related Art

In recent years, motors that employ high-performance rare-earth permanent magnets have been widely used in various machines and appliances. At the same time, to avoid resource risk, research has also been made on motors that employ no or less rare-earth permanent magnets.

For example, Japanese Patent Application Publication No. 2004-357489 discloses a motor which employs a consequent-pole rotor so as to reduce the number of rare-earth permanent magnets used in the motor while maintaining high performance of the motor. The consequent-pole rotor includes a plurality of rare-earth permanent magnets, all of which are magnetized in the same direction, and a plurality of opposite poles that are formed by core portions provided between the permanent magnets.

More specifically, in the consequent-pole rotor, all of the permanent magnets are magnetized in the same direction so as to each form a magnet pole. Each of the core portions provided between the permanent magnets forms a consequent pole (or induced pole) that has an opposite polarity to the magnetic poles. That is, for each pole pair, one of the magnetic poles of the pole pair is formed without using a permanent magnet. Consequently, the number of the permanent magnets used in the motor is reduced by half in comparison with the case of forming each of all the magnetic poles with a permanent magnet.

However, the inventor of the present application has found, through an experimental investigation, a problem with the above motor that employs the consequent-pole rotor. That is, in the motor, the permeance of the rotor greatly changes at the boundaries between the magnet poles and the consequent poles. As a result, vibration of a stator core (or armature core) of the motor may be increased, thereby increasing noise of the motor caused by the vibration of the stator core.

More specifically, vibration of the stator core is increased when the change in the permeance of the rotor is in agreement with variation in the spatial magnetic flux created by the armature reaction of the stator (or armature) of the motor. Therefore, to suppress vibration of the stator core, it is necessary to alleviate the variation in the spatial magnetic flux or the change in the permeance of the rotor.

FIG. 7 illustrates an example where the rotor 101 of a conventional full-pitch distributed winding motor is configured as a consequent-pole rotor. In this motor, there are provided three slots of the stator 102 per magnetic pole of the rotor 101. Further, the pitch of the variation in the spatial magnetic flux created by the armature reaction of the stator 102, i.e., the winding pitch j of each of U-phase, V-phase and W-phase windings of the stator 102 is coincident with the pitch k of the boundaries between the magnet poles 104 and the consequent poles 105. Consequently, vibration of the stator core of the stator 102 is amplified, thereby significantly increasing the noise of the motor caused by the vibration of the stator core.

Therefore, it is desired to effectively suppress vibration of the stator core of a motor when the rotor of the motor is configured as a consequent-pole rotor.

SUMMARY

According to an exemplary embodiment, a motor system includes a motor and an inverter. The motor includes a rotor and a stator that is disposed to face the rotor with a gap formed therebetween. The rotor includes a plurality of magnet poles, which have the same polarity at a periphery of the rotor facing the stator, and a plurality of consequent poles that have an opposite polarity to the magnet poles at the periphery of the rotor. Each of the magnet poles is formed of at least one permanent magnet, and each of the consequent poles is formed of a soft magnetic material. The magnet poles are alternately arranged with the consequent poles in a circumferential direction of the rotor. The stator includes a stator core and a stator coil mounted on the stator core. The stator core has a plurality of slots that are formed in a surface of the stator core facing the rotor and arranged in a circumferential direction of the stator core at predetermined intervals. The stator coil is comprised of first and second m-phase coils that are electrically insulated from each other, where m is an integer greater than 1. The number of the slots of the stator core provided per circumferentially-adjacent pair of the magnet and consequent poles is equal to 4m. Each of the first and second m-phase coils is comprised of m phase windings. The first and second m-phase coils are received in the slots of the stator core so that the phase windings of the first m-phase coil are alternately arranged with the phase windings of the second m-phase coil in the circumferential direction of the stator core. The inverter energizes the first and second m-phase coils to cause them to respectively create first and second spatial magnetic fluxes in the gap between the rotor and the stator. Variation in a resultant spatial magnetic flux, which is the resultant of the first and second spatial magnetic fluxes, is less than variations in the first and second spatial magnetic fluxes in the circumferential direction of the rotor.

With the above configuration, though the permeance of the rotor changes greatly at the boundaries between the magnet poles and the consequent poles, it is still possible to suppress vibration of the stator core, thereby lowering noise of the motor caused by the vibration of the stator core.

According to a further implementation, the first and second m-phase coils are received in the slots of the stator core with a spatial phase difference therebetween. The inverter is comprised of first and second m-phase inverters. The first m-phase inverter supplies first m-phase alternating current to the first m-phase coil, and the second m-phase inverter supplies second m-phase alternating current to the second m-phase coil. Between the first and second m-phase alternating currents, there is provided a temporal phase difference that is equal in electrical angle to the spatial phase difference between the first and second m-phase coils.

For example, m may be equal to 3. In this case, the spatial phase difference between the first and second three-phase coils is preferably equal to 30° in electrical angle. The temporal phase difference between the first and second three-phase alternating currents is also preferably equal to 30° in electrical angle.

It is preferable that: for each of the magnet poles, the number of the slots of the stator core which face the magnet pole is greater than 2m; for each of the consequent poles, the number of the slots of the stator core which face the consequent pole is less than 2m.

The permanent magnets that form the magnet poles may be disposed at the periphery of the rotor which faces the stator.

Alternatively, the permanent magnets that form the magnet poles may be disposed inside of the periphery of the rotor which faces the stator.

Each of the magnet poles has an angular width θm and each of the consequent poles has an angular width θc. The angular widths θm and θc are preferably set based on the following relationship:

θm:θc=Bst:Br, where Br is the residual magnetic flux density of the permanent magnets that form the magnet poles, and Bst is the saturation magnetic flux density of the soft magnetic material that forms the consequent poles.

Preferably, each of the phase windings of the first and second m-phase coils is formed of a plurality electric conductor segments. Each of the electric conductor segments has a substantially U-shape to include a pair of leg portions and a turn portion that connects the leg portions. Each corresponding pair of distal ends of the leg portions of the electric conductor segments are joined together by, for example, welding.

BRIEF DESCRIPTION OF THE DRAWINGS

The present invention will be understood more fully from the detailed description given hereinafter and from the accompanying drawings of exemplary embodiments, which, however, should not be taken to limit the invention to the specific embodiments but are for the purpose of explanation and understanding only.

In the accompanying drawings:

FIG. 3A is a schematic view in the axial direction of a stator core of the motor illustrating the arrangement of a stator coil of the motor;

FIG. 3B is a schematic view in the radial direction of the stator core illustrating the arrangement of the stator coil;

FIG. 4 is a schematic view illustrating advantages of the motor system according to the first embodiment;

FIG. 5 is a schematic view illustrating disadvantages of a motor system according to a comparative example;

FIG. 9A is a perspective view of an electric conductor segment for forming a stator coil according to a third embodiment; and FIG. 9B is a perspective view showing part of the stator coil according to the third embodiment.

DESCRIPTION OF EMBODIMENTS

Figure 1:
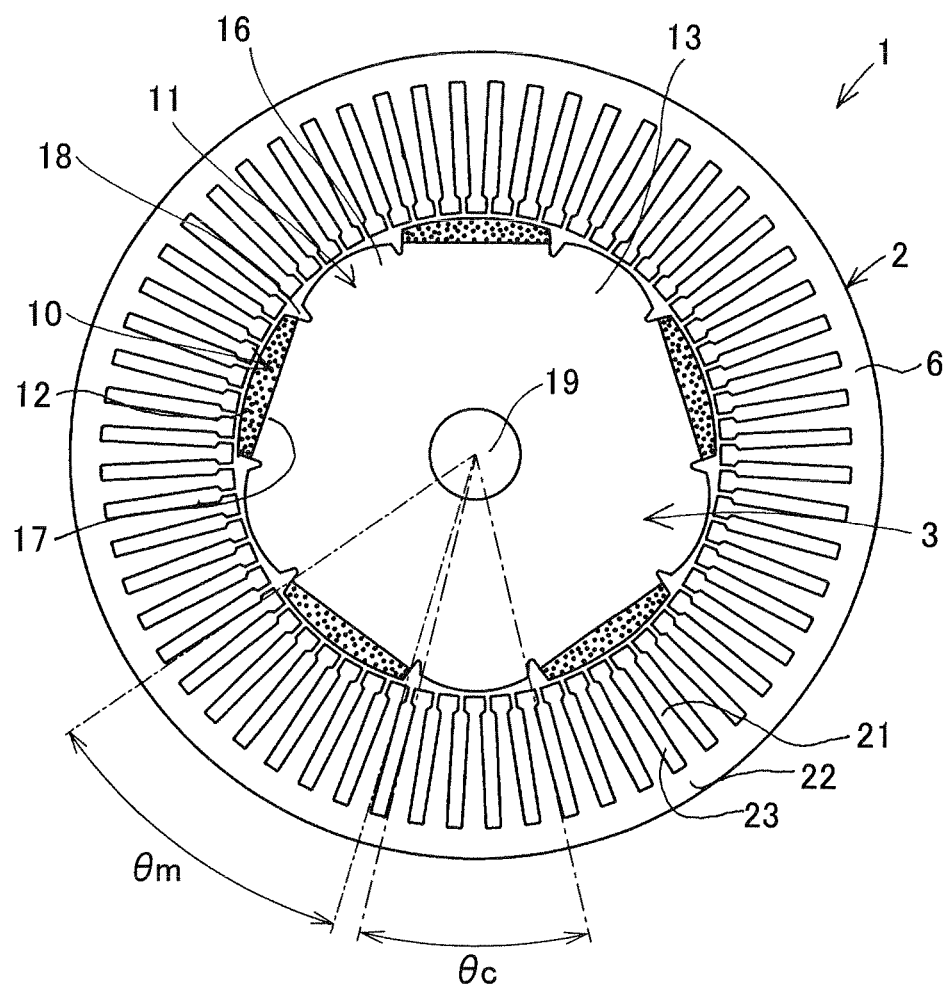
FIG. 1 is a schematic axial view illustrating the overall configuration of a motor of a motor system according a first embodiment.

Exemplary embodiments will be described hereinafter with reference to FIGS. 1-9. It should be noted that for the sake of clarity and understanding, identical components having identical functions in different embodiments have been marked, where possible, with the same reference numerals in each of the figures and that for the sake of avoiding redundancy, descriptions of the identical components will not be repeated.

[First Embodiment]

FIG. 1 shows the overall configuration of a motor 1 of a motor system according to a first embodiment. In this embodiment, the motor 1 is configured as a three-phase AC motor.

As shown in FIG. 1, the motor 1 includes a stator 2, which is configured to create a rotating magnetic field, and a rotor 3 that is disposed radially inside of the stator 2 so as to be rotated by the rotating magnetic field.

In the present embodiment, the rotor 3 is configured as a consequent-pole rotor to include a plurality of magnet poles 10 and a plurality of consequent poles 11. Each of the magnet poles 10 is formed of a permanent magnet 12. On the other hand, each of the consequent poles 11 is formed of a soft magnetic material. The magnet poles 10 are alternately arranged with the consequent poles 11 in the circumferential direction of the rotor 3.

More specifically, the rotor 3 includes a plurality (e.g., 5 in the present embodiment) of permanent magnets 12 and a cylindrical rotor core 13 that is made of a soft magnetic material such as iron.

The rotor core 13 has a plurality of protrusions 16 and a plurality of magnet-fixing portions 17. The protrusions 16 are formed at the radially outer periphery of the rotor core 13 and spaced in the circumferential direction of the rotor 3 (i.e., the circumferential direction of the rotor core 13) at predetermined equal intervals. Each of the magnet-fixing portions 17 is formed between a circumferentially-adjacent pair of the protrusions 16 so as to be recessed radially inward from the protrusions 16. Moreover, each of the magnet-fixing portions 17 has a corresponding one of the permanent magnets 12 fixed thereon.

Further, the permanent magnets 12 are fixed on the corresponding magnet-fixing portions 17 of the rotor core 13 so that all the magnetization directions of the permanent magnets 12 are identical to each other. More specifically, in the present embodiment, all of the five permanent magnets 12 are fixed with the respective N (north) poles facing radially outward. Each of the permanent magnets 12 makes up one of the magnet poles 10. In other words, the magnet poles 10 are formed by arranging the permanent magnets 12 at the radially outer periphery of the rotor 3. In addition, the permanent magnets 12 are rare-earth magnets which are made of, for example, neodymium and dysprosium.

Moreover, the magnetic fluxes created by the permanent magnets 12 flow radially inward into the protrusions 16 of the rotor core 13. In this sense, the protrusions 16 can be considered as S (south) poles. In other words, each of the protrusions 16 forms a consequent pole (or induced pole) 11 that has an opposite polarity to the magnet poles 10 at the radially outer periphery of the rotor 3.

In addition, between each circumferentially-adjacent pair of the magnet poles 10 and consequent poles 11, there is further provided a gap 18 that makes up a magnetic barrier between the pair of the magnet and consequent poles 10 and 11.

Accordingly, in the present embodiment, the rotor 3 has five magnet poles 10 and five consequent poles 11. That is, the rotor 3 has a total of ten magnetic poles (or five pairs of magnetic poles).

In addition, the rotor core 13 is fixed on a rotating shaft 19 that is made of a nonmagnetic material such as stainless steel.

The stator 2 includes a stator core 6 and a stator coil 7 wound on the stator core 6. When the stator coil 7 is supplied with three-phase alternating current, the stator 2 creates the rotating magnetic field, thereby rotating the rotor 3 that is surrounded by the stator 2. In addition, it should be noted that for the sake of simplicity, the stator coil 7 is omitted from FIG. 1.

In the present embodiment, the stator core 6 is formed, by laminating a plurality of magnetic steel sheets, into a hollow cylindrical shape. The stator coil 7 is comprised of two three-phase coils, the details of which will be described later.

The stator core 6 includes a plurality of teeth 21 and an annular yoke portion 22. Each of the teeth 21 has its distal end facing the rotor 3. The yoke portion 22 connects all the proximal ends of the teeth 21 on the opposite side to the rotor 3 (or on the radially outside of the teeth 21).

Moreover, on the radially inner side of the yoke portion 22, the teeth 21 are arranged in the circumferential direction of the stator core 6 (or the circumferential direction of the yoke portion 22) at predetermined equal intervals. Between each circumferentially-adjacent pair of the teeth 21, there is formed a slot 23.

In the present embodiment, the number of the teeth 21 is equal to 60. The number of the slots 23 is also equal to 60. Accordingly, the number of the slots 23 provided per circumferentially-adjacent pair of the magnet poles 10 and consequent poles 11 is equal to 12 (i.e., equal to 4m, where m represents the number of phases of the stator coil 7 and is equal to 3 in the present embodiment). Consequently, the pitch of the slots 23 is equal to 30° in electrical angle. In other words, the pitch of the slots 23 corresponds to an electrical angle of 30°.

Further, in the present embodiment, the angular width $\theta m$ of the magnet poles 10 is set so that each of the magnet poles 10 faces 7 (i.e., 2m+1) slots 23. On the other hand, the angular width $\theta c$ of the consequent poles 11 is set so that each of the consequent poles 10 faces 5 (i.e., 2m−1) slots 23. That is, each of the magnet poles 10 faces more than 6 (i.e., 2m) slots 23, while each of the consequent poles 11 faces less than 6 slots 23.

In addition, the sum of the number of the slots 23 each of the magnet poles 10 faces and the number of the slots 23 each of the consequent poles 11 faces is not necessarily equal to 12 (i.e., 4m). For example, when the angular width of the magnetic barriers 18 provided between the magnet poles 10 and the consequent poles 11 is set sufficiently large, some of the slots 23 face neither the magnet poles 10 nor the consequent poles 11, but the magnetic barriers 18.

More specifically, in the present embodiment, the angular width $\theta m$ of the magnet poles 10 is set to 207° in electrical angle, and the angular width $\theta c$ of the consequent poles 11 is set to 145° in electrical angle. In other words, the angular width $\theta m$ of the magnet poles 10 is so set as to correspond to an electrical angle of 207°, and the angular width $\theta c$ of the consequent poles 11 is so set as to correspond to an electrical angle of 145°. That is, the angular width $\theta m$ of the magnet poles 10 is set to be greater than the angular width $\theta c$ of the consequent poles 11.

Moreover, in the present embodiment, the angular width $\theta m$ of the magnet poles 10 and the angular width $\theta c$ of the consequent poles 11 are set based on the following relationship:

$$\theta m : \theta c = Bst : Br \quad (1)$$

where Br is the residual magnetic flux density of the permanent magnets 12 that form the magnet poles 10, and Bst is the saturation magnetic flux density of the soft magnetic material that forms the consequent poles 11.

For example, when the residual magnetic flux density Br of the permanent magnets 12 is 1.4 T (tesla) and the saturation magnetic flux density Bst of the soft magnetic material is 1.9 T, the angular width $\theta m$ of the magnet poles 10 is determined, based on the above relationship (1), to be approximately equal to 207° in electrical angle.

More specifically, the amount $\phi m$ of magnetic flux passing through the magnet poles 10 is proportional to $\theta m \times Br$, and the amount $\phi c$ of magnetic flux passing through the consequent poles 11 is proportional to $(2\pi - \theta m) \times Bst$. Further, to maximize the amount of interlinkage magnetic flux that flows between the magnet poles 10 and the consequent poles 11 and intersects with the stator coil 7, it is necessary to satisfy that $\phi m = \phi c$. Consequently, by back-calculating from the equation of $\theta m \times Br = (2\pi - \theta m) \times Bst$, it is possible to obtain that $\theta m \approx 207°$. In addition, considering the angular width of the magnetic barriers 18 provided between the magnet poles 10 and the consequent poles 11, the angular width $\theta c$ of the consequent poles 11 is set to 145° in electrical angle which is less than (360°-207°).

Similarly, when the residual magnetic flux density Br of the permanent magnets 12 is 1.2 T and the saturation magnetic flux density Bst of the soft magnetic material is 1.9 T, the angular width $\theta m$ of the magnet poles 10 is determined, based on the above relationship (1), to be approximately equal to 220° in electrical angle.

Figure 2:
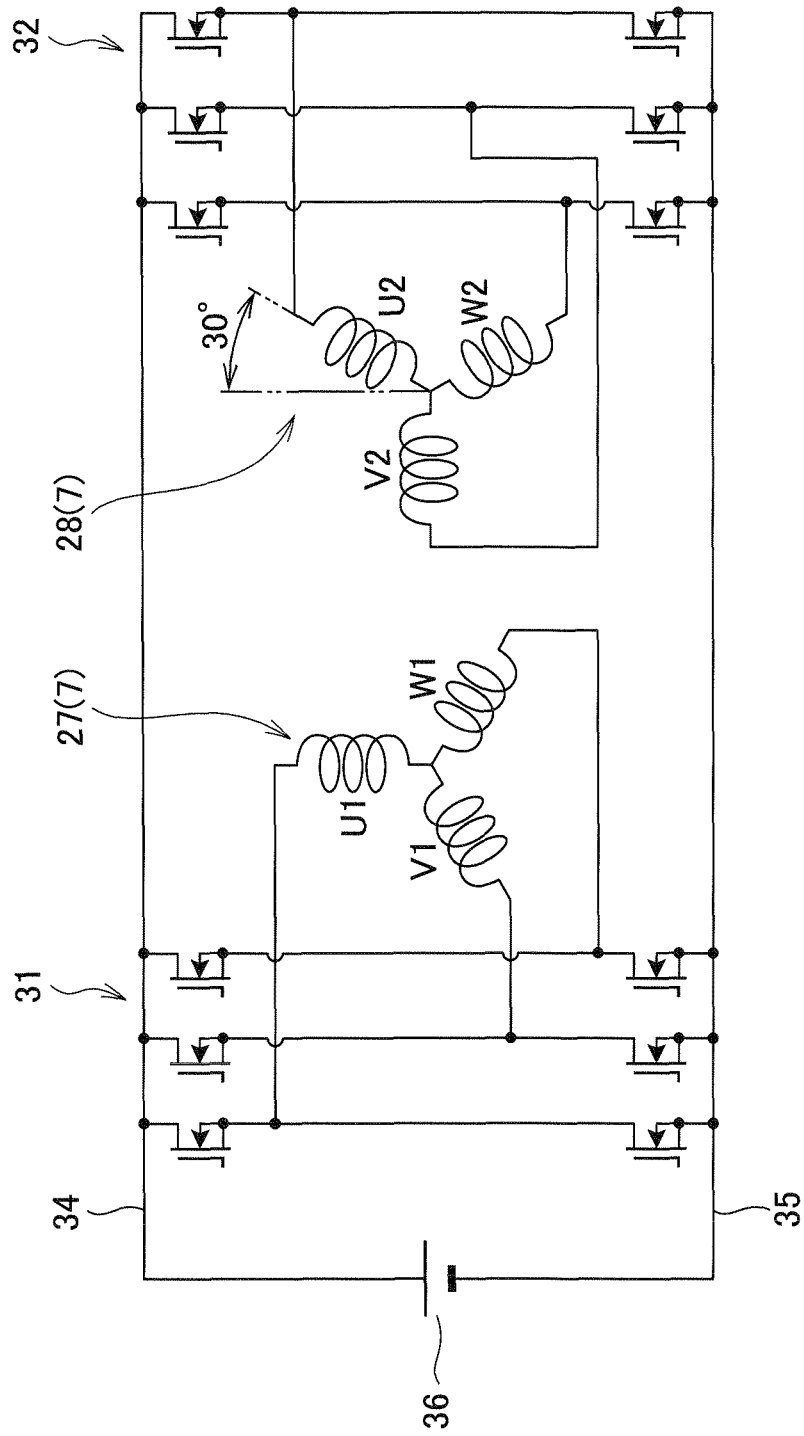
FIG. 2 is a schematic circuit diagram of the motor system according to the first embodiment.

Referring now to FIG. 2, in the present embodiment, the stator coil 7 is comprised of a first three-phase coil 27 and a second three-phase coil 28. Further, the first three-phase coil 27 is comprised of three phase windings U1, V1 and W1 that are Y-connected together. On the other hand, the second three-phase coil 28 is comprised of three phase windings U2, V2 and W3 that are also Y-connected together.

In the present embodiment, the motor system further includes first and second three-phase inverters 31 and 32. The first three-phase inverter 31 is electrically connected to the first three-phase coil 27 so as to supply first three-phase alternating current to the first three-phase coil 27. On the other hand, the second three-phase inverter 32 is electrically connected to the second three-phase coil 28 so as to supply second three-phase alternating current to the second three-phase coil 28.

Further, the first three-phase coil 27 and the second three-phase coil 28 are electrically insulted from each other. The first three-phase inverter 31 and the second three-phase inverter 32 are electrically insulated from each other at the AC parts thereof, but electrically connected to each other at the DC parts thereof. More specifically, both the first three-phase inverter 31 and the second three-phase inverter 32 are electrically connected to a positive terminal 34 and a negative terminal 35 of a DC power source 36.

In addition, both the first and second three-phase inverters 31 and 32 are of a well-known type. It should be noted that only the switching elements of the first and second three-phase inverters 31 and 32 are shown in FIG. 2, and the controlling circuits and other elements of the same are omitted from FIG. 2.

In the present embodiment, the stator coil 7 is wound on the stator core 6 using a full-pitch distributed winding method.

The first and second three-phase coils 27 and 28 are received in the slots 23 of the stator core 6 so that the phase windings U1-W1 of the first three-phase coil 27 are alternately arranged with the phase windings U2-W2 of the second three-phase coil 28 in the circumferential direction of the stator core 6. That is, the phase windings U1-W1 of the first three-phase coil 27 are received in the odd-numbered slots 23 of the stator core 6, while the phase windings U2-W2 of the second three-phase coil 28 are received in the even-numbered slots 23 of the stator core 6.

More specifically, as shown in FIG. 3A, the phase windings of the first and second three-phase coils 27 and 28 are received in the slots 23 of the stator core 6 so as to be arranged in the circumferential direction of the stator core 6 in the sequence of U1, U2, W1, W2, V1 and V2.

With the above arrangement, since the pitch of the slots 23 of the stator core 6 is equal to 30° in electrical angle, the spatial phase difference between the first and second three-phase coils 27 and 28 is also equal to 30° in electrical angle. In other words, the difference in circumferential position between the first and second three-phase coils 27 and 28 corresponds to an electrical angle of 30°.

In the present embodiment, each of the phase windings U1-W1 and U2-W2 of the first and second three-phase coils 27 and 28 is formed of a continuous electric conductor with a substantially rectangular cross section and includes a plurality of turn portions 38 and a plurality of in-slot portions 39. Each of the in-slot portions 39 is received in a corresponding one of the slots 23 of the stator core 6. Each of the turn portions 38 is located outside of the slots 23 of the stator core 6 to connect a corresponding pair of the in-slot portions 39. Moreover, the turn portions 38 are arranged in the circumferential direction of the stator core 6 so as to be alternately located on opposite axial sides of the stator core 6.

For example, referring to FIG. 3B, the phase winding U2 of the second three-phase stator coil 28 has the in-slot portion 39a received in the slot 23a of the stator core 6, the in-slot portion 39b received in the slot 23g of the stator core 6, and the turn portion 38a extending across the five consecutive slots 23b-23f to connect the in-slot portions 39a and 39b. Moreover, referring also to FIG. 3A, the direction of the electric current flowing in the in-slot portion 39a is opposite to that of the electric current flowing in the in-slot portion 39b.

In addition, it should be noted that the phase windings U1-W1 of the first three-phase coil 27 and the phase windings V2 and W2 of the second three-phase winding 28 are wound on the stator core 6 in the same manner as the phase winding U2.

Furthermore, in the present embodiment, the first and second three-phase inverters 31 and 32 respectively supply the first and second three-phase alternating currents to the first and second three-phase coils 27 and 28, with a temporal phase difference between the first and second three-phase alternating currents which corresponds to the spatial phase difference between the first and second three-phase coils 27 and 28.

Specifically, as described above, the spatial phase difference between the first and second three-phase coils 27 and 28 is equal to 30° in electrical angle. Therefore, the first and second three-phase inverters 31 and 32 respectively supply the first and second three-phase alternating currents to the first and second three-phase coils 27 and 28, with the temporal phase difference between the first and second three-phase alternating currents being equal to 30° in electrical angle.

For example, the spatial phase difference between the phase winding U1 of the first three-phase coil 27 and the phase winding U2 of the second three-phase coil 28 is equal to 30° in electrical angle. Accordingly, the temporal phase difference between the electric current flowing in the phase winding U1 of the first three-phase coil 27 and the electric current flowing in the phase winding U2 of the second three-phase coil 28 is also equal to 30° in electrical angle.

After having described the configuration of the motor system according to the embodiment, advantages thereof will be described hereinafter.

In the present embodiment, the motor system includes the motor 1 and the first and second three-phase inverters 31 and 32. The motor 1 includes the rotor 3 and the stator 2 that is disposed radially outside of the rotor 3 so as to face the rotor 3 through the gap formed therebetween. The rotor 3 includes the magnet poles 10 and the consequent poles 11 the polarity of which is opposite to the polarity of the magnet poles 10. Each of the magnet poles 10 is formed of one of the permanent magnets 12, and each of the consequent poles 11 is formed of one of the protrusions 16 of the rotor core 13 that is made of the soft magnetic material. The magnet poles 10 are alternately arranged with the consequent poles 11 in the circumferential direction of the rotor 3. The stator 2 includes the stator core 6 and the stator coil 7 wound on the stator core 6. The stator core 6 has the slots 23 that are formed in the radially inner surface of the stator core 6 and arranged in the circumferential direction of the stator core 6 at the predetermined equal intervals. The stator coil 7 is comprised of the first and second 3-phase coils 27 and 28 that are electrically insulated from each other. The number of the slots 23 of the stator core 6 provided per circumferentially-adjacent pair of the magnet and consequent poles 10 and 11 is equal to 12 (i.e., 4×m with m being equal to 3). Each of the first and second 3-phase coils 27 and 28 is comprised of three phase windings. The first and second 3-phase coils 27 and 28 are received in the slots 23 of the stator core 6 so that the phase windings U1-W1 of the first three-phase coil 27 are alternately arranged with the phase windings U2-W2 of the second three-phase coil 28. The first and second three-phase inverters 31 and 32 respectively energize the first and second 3-phase coils 27 and 28, thereby causing them to respectively create first and second spatial magnetic fluxes in the gap between the rotor 3 and the stator 2.

FIG. 4 shows variations in the first and second spatial magnetic fluxes and a resultant spatial magnetic flux in the circumferential direction (or the rotational direction) of the rotor 3; the resultant spatial magnetic flux is the resultant of the first and second spatial magnetic fluxes.

It should be noted that in FIG. 4 and FIG. 5 (to be descried later), the vertical axis represents relative values of the magnetic fluxes which are obtained by dividing the actual values of the magnetic fluxes by a predetermined reference value, and the horizontal axis represents the circumferential position in electrical angle.

As shown in FIG. 4, both the first spatial magnetic flux that is created by the armature reaction of the first three-phase coil 27 and the second spatial magnetic flux that is created by the armature reaction of the second three-phase coil 28 vary in the circumferential direction of the rotor 3. Consequently, the resultant spatial magnetic flux also varies in the circumferential direction of the rotor 3.

However, in the present embodiment, the first and second three-phase inverters 31 and 32 respectively energize the first and second three-phase coils 27 and 28 so that the variation in the resultant spatial magnetic flux is considerably reduced in comparison with the variations in the first and second spatial magnetic fluxes.

Consequently, though the permeance of the rotor 3 changes greatly at the boundaries between the magnet poles 10 and the consequent poles 11, it is still possible to suppress vibration of the stator core 6, thereby lowering noise of the motor 1 caused by the vibration of the stator core 6.

Further, in the present embodiment, the first and second three-phase coils 27 and 28 are received in the slots 23 of the stator core 6, with the spatial phase difference therebetween being equal to 30° in electrical angle. The first and second three-phase inverters 31 and 32 respectively supply the first and second three-phase alternating currents to the first and second three-phase coils 27 and 28, with the temporal phase difference between the first and second three-phase alternating currents being equal to 30° in electrical angle. That is, the temporal phase difference between the first and second three-phase alternating currents is equal in electrical angle (in other words, exactly corresponds) to the spatial phase difference between the first and second three-phase coils 27 and 28.

Consequently, the phase difference between the variation in the first spatial magnetic flux created by the first three-phase coil 27 and the variation in the second spatial magnetic flux created by the second three-phase coil 28 becomes also equal to 30° in electrical angle. As a result, the peak positions of the first spatial magnetic flux are offset from the peak positions of the second spatial magnetic flux, thereby reducing the variation in the resultant spatial magnetic flux.

In particular, in the present embodiment, the peak positions of the first spatial magnetic flux coincide with the trough positions of the second spatial magnetic flux. As a result, it becomes possible to minimize the variation in the resultant spatial magnetic flux.

Figure 7:
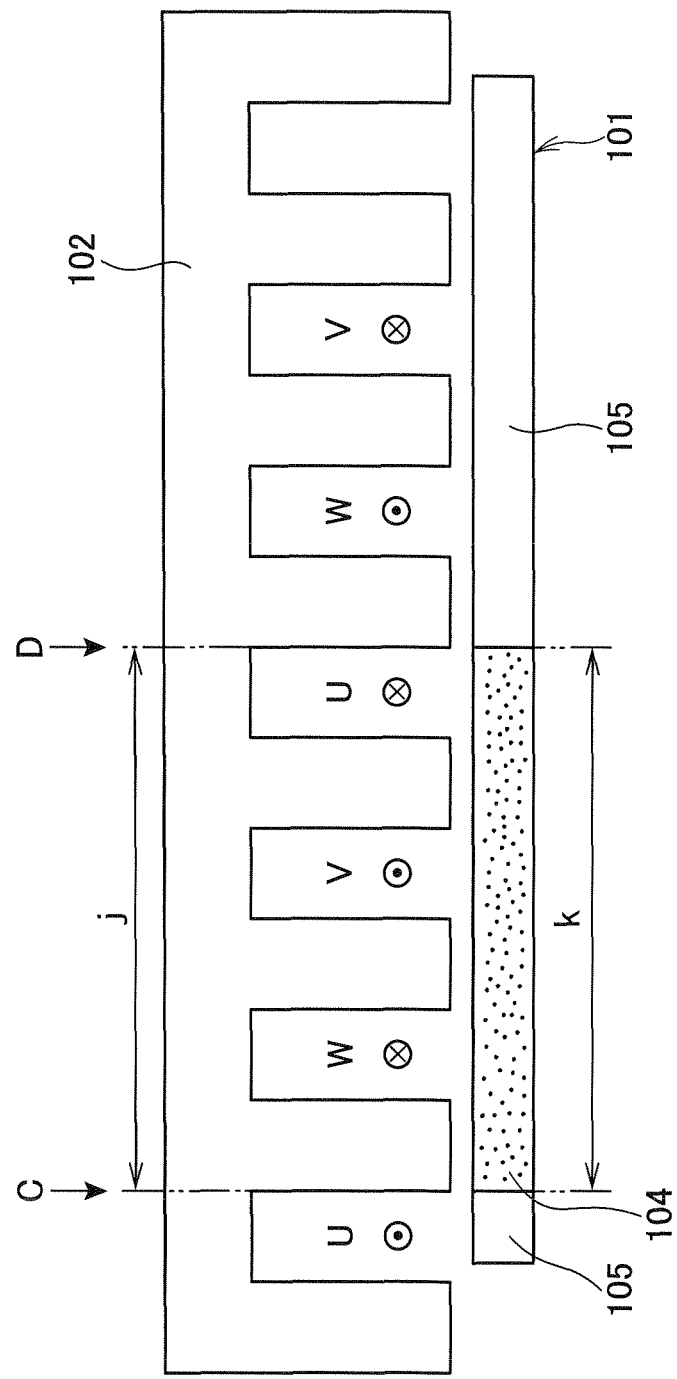
FIG. 7 is a schematic view illustrating the relative position between a stator coil and the boundaries between the magnet and consequent poles of a rotor in the motor system according to the comparative example.

FIG. 5 shows variation in the spatial magnetic flux created by the stator coil of the motor according to the comparative example which is previously described with reference to FIG. 7 in the "Description of the Related Art" section. The stator coil is made up of a single three-phase coil that is wound on the stator core using a full-pitch distributed winding method.

As shown in FIG. 5, in this comparative example, the variation in the spatial magnetic flux is greater than the variation in the resultant spatial magnetic flux according to the present embodiment.

More specifically, the peak-to-peak amplitude $\Delta\phi1$ of the resultant spatial magnetic flux according to the present embodiment is reduced by 75% in comparison with the peak-to-peak amplitude $\Delta\phi2$ of the spatial magnetic flux according to the comparative example.

Furthermore, in the present embodiment, for each of the magnet poles 10, the number of the slots 23 of the stator core 6 which face the magnet pole 10 is equal to 7, i.e., greater than 2m with m being equal to 3. On the other hand, for each of the consequent poles 11, the number of the slots 23 of the stator core 6 which face the consequent pole 11 is equal to 5, i.e., less than 2m.

Consequently, the change in the permeance of the rotor 3 is not coincident with the variation in the resultant spatial magnetic flux, thereby preventing the vibration of the stator core 6 from being amplified.

More specifically, the permeance of the rotor 3 changes greatly at the boundaries between the magnet poles 10 and the consequent poles 11. However, the resultant spatial magnetic flux does not have the same value at all the boundaries between the magnet poles 10 and the consequent poles 11. For example, as shown in FIG. 4, the boundary A on the left side of the magnet pole 10 coincides with one of the troughs of the resultant spatial magnetic flux, whereas the boundary B on the right side of the magnet pole 10 coincides with one of the peaks of the resultant spatial magnetic flux.

On the other hand, in the comparative example, the change in the permeance of the rotor 101 is coincident with the variation in the spatial magnet flux, thereby amplifying the vibration of the stator core of the stator 102.

More specifically, the spatial magnetic flux has the same value at all the boundaries between the magnet poles 104 and the consequent poles 105. For example, as shown in FIG. 5, each of the boundaries C and D on the left and right sides of the magnet pole 104 coincides with a corresponding one of the troughs of the spatial magnetic flux.

Moreover, in the present embodiment, the angular width $\theta m$ of the magnet poles 10 and the angular width $\theta c$ of the consequent poles 11 are set based on the relationship (1), i.e., $\theta m:\theta c=Bst:Br$.

Consequently, the angular width $\theta m$ of the magnet poles 10 becomes greater than the angular width $\theta c$ of the consequent poles 11. More specifically, in the present embodiment, the angular width $\theta m$ of the magnet poles 10 is set to 207° in electrical angle, while the angular width $\theta c$ of the consequent poles 11 is set to 145° in electrical angle. As a result, the angular width $\theta m$ of the magnet poles 10 is increased by 15% in comparison with the angular width of the magnet poles 104 (i.e., 180°) according to the comparative example. Accordingly, the amount of magnetic flux created by the magnet poles 10 is also increased by 15% in comparison with the amount of magnetic flux created by the magnet poles 104 according to the comparative example.

In addition, using the above relationship (1), it is possible to suitably set the angular width $\theta m$ of the magnet poles 10 and the angular width $\theta c$ of the consequent poles 11 according to the materials of the magnet poles 10 and the consequent poles 11 (or the rotator core 13).

Furthermore, in the present embodiment, since the angular width $\theta m$ of the magnet poles 10 is set to be different from the angular width $\theta c$ of the consequent poles 11, the winding pitch j of each of the phase windings U1-W1 and U2-W2 of the first and second three-phase coils 27 and 28 is accordingly not equal to the intervals k between the boundaries between the magnet poles 10 and the consequent poles 11. In other words, not each of the boundaries between the magnet poles 10 and the consequent poles 11 is located at a phase-changing position of the stator coil 7. As a result, it is possible to reliably prevent the vibration of the stator core 6 from being amplified.

Figure 6:
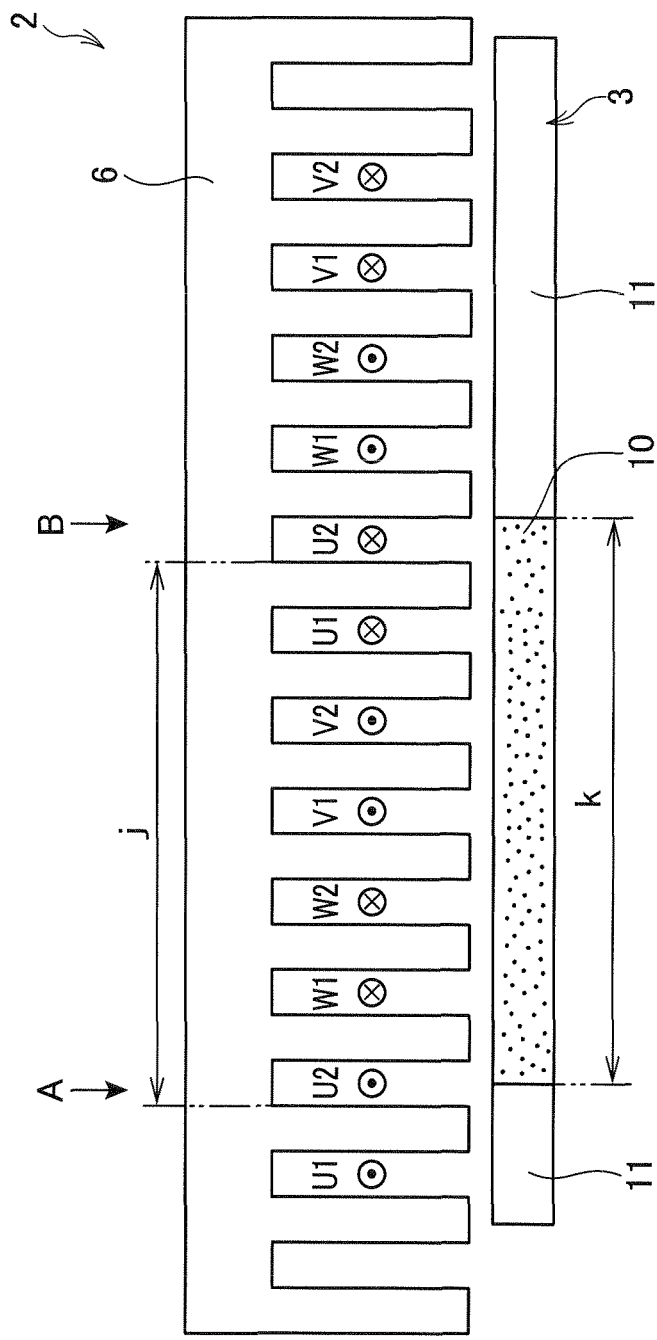
FIG. 6 is a schematic view illustrating the relative position between the stator coil and the boundaries between the magnet and consequent poles of a rotor in the motor system according to the first embodiment.

For example, as shown in FIG. 6, the boundary A on the left side of the magnet pole 10 is located at a circumferential position which falls only on the phase winding U2 of the second three-phase coil 28. In other words, the boundary A is located not at a phase-changing position of the stator coil 7. In comparison, the boundary B on the right side of the magnet pole 11 is located at a circumferential position between the phase winding U2 of the second three-phase coil 28 and the phase winding W1 of the first three-phase coil 27. In other words, the boundary B is located at a phase-changing position of the stator coil 7.

On the other hand, in the comparative example, the angular width of the magnet poles 104 is set to be equal to that of the consequent poles 105. Thus, the winding pitch j of each of U-phase, V-phase and W-phase windings of the stator coil is accordingly equal to the pitch k of the boundaries between the magnet poles 104 and the consequent poles 105. Consequently, each of the boundaries between the magnet poles 104 and the consequent poles 105 is located at a phase-changing position of the stator coil. As a result, vibration of the stator core of the stator 102 is amplified, thereby significantly increasing the noise of the motor caused by the vibration of the stator core.

[Second Embodiment]

This embodiment illustrates a motor 1 which has almost the same configuration as the motor 1 according to the first embodiment; therefore, only the differences therebetween will be described hereinafter.

In the first embodiment, as shown in FIG. 1, each of the magnet poles 10 is formed of one permanent magnet 12.

Moreover, all the permanent magnets 12 are disposed at the radially outer periphery of the rotor 3 which faces the stator 2.

Figure 8:
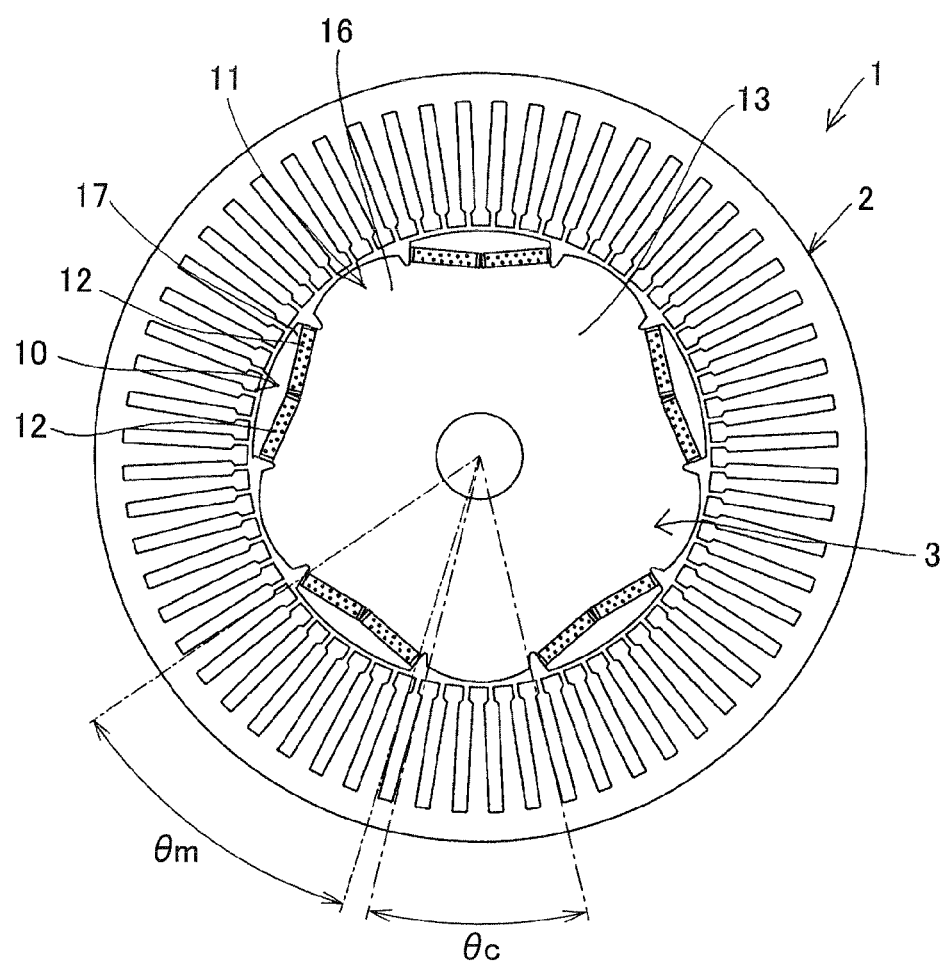
FIG. 8 is a schematic axial view illustrating the overall configuration of a motor according a second embodiment.

In comparison, in the present embodiment, as shown in FIG. 8, each of the magnet poles 10 is formed of a pair of permanent magnets 12. Moreover, all the permanent magnets 12 are embedded in the rotor core 13. In other words, all the permanent magnets 12 are disposed inside of the radially outer periphery of the rotor 3 which faces the stator 2.

More specifically, in the present embodiment, the rotor core 13 has a plurality of protrusions 16 and a plurality of magnet-fixing portions 17. The protrusions 16 are formed at the radially outer periphery of the rotor core 13 and spaced in the circumferential direction of the rotor 3 (i.e., the circumferential direction of the rotor core 13) at predetermined equal intervals. Each of the magnet-fixing portions 17 is formed between a circumferentially-adjacent pair of the protrusions 16 so as to protrude radially outward in the same manner as the protrusions 16. Moreover, each of the magnet-fixing portions 17 has a pair of permanent magnets 12 embedded therein, thereby forming one magnet pole 10.

In addition, in each of the magnet-fixing portions 17, the pair of permanent magnets 12 is embedded so as to have a substantially "V" shape that opens radially outward.

Moreover, as in the first embodiment, each of the protrusions 16 forms one consequent pole 11 that has an opposite polarity to the magnet poles 10 at the radially outer periphery of the rotor 3. Further, the angular width θm of the magnet poles 10 is set to be greater than the angular width θc of the consequent poles 11.

With the above formation of the magnet poles 10 and consequent poles 11, it is possible to achieve the same advantages as described in the first embodiment.

[Third Embodiment]

This embodiment illustrates a motor 1 which has almost the same configuration as the motor 1 according to the first embodiment; therefore, only the differences therebetween will be described hereinafter.

In the first embodiment, each of the phase windings U1-W1 and U2-W2 of the first and second three-phase coils 27 and 28 is formed of a continuous electric conductor.

In comparison, in the present embodiment, each of the phase windings U1-W1 and U2-W2 of the first and second three-phase coils 27 and 28 is formed by joining a plurality of electric conductor segments 45.

More specifically, as shown in FIG. 9A, each of the electric conductor segments 45 has a substantially U-shape to include a pair of leg portions 46 and a turn portion 47 that connects the leg portions 46.

In forming the stator coil 7, each of the electric conductor segments 45 is first deformed, from the substantially U-shape as shown with two-dot chain lines in FIG. 9A, to spread the leg portions 46 symmetrically with respect to the turn portion 47, thereby having a spread U-shape as shown with dashed lines in FIG. 9A. Then, the leg portions 46 are axially inserted, from one axial side (i.e., the lower side in FIG. 9B) of the stator core 6, into corresponding ones of the slots 23 of the stator core 6, so as to have distal end parts of the leg portions 46 protruding from the corresponding slots 23 on the other axial side (i.e., the upper side in FIG. 9B) of the stator core 6. Those parts of the leg portions 46 which are received in the corresponding slots 23 make up in-slot portions 39 of the stator coil 7. Thereafter, the leg portions 26 are bent, at the boundaries between the distal end parts and the in-slot portions 39, so as to have the respective distal end parts extending toward opposite circumferential directions of the stator core 6 as shown with solid lines in FIG. 9A.

Next, each corresponding pair of the distal ends 46a of the leg portions 46 of the electric conductor segments 45 is joined together by, for example, welding. Consequently, the stator coil 7 is obtained.

In addition, all the turn portions 47 of the electric conductor segments 45 together make up one coil end 38 of the stator coil 7 on the one axial side of the stator core 6; all the distal end parts of the leg portions 46 of the electric conductor segments 45 together make up another coil end 38 of the stator coil 7 on the other axial side of the stator core 6.

Using the electric conductor segments 45, it is possible to easily form the stator coil 7 and assemble the stator coil 7 to the stator core 6 in the above-described manner, thereby improving the productivity.

Moreover, the coil ends 38 of the stator coil 7 can be densely arranged on both the axial sides of the stator core 6, thereby making it possible to minimize the size the motor 10.

In addition, the size of the coil ends of the stator coil in a distributed winding motor is generally greater than that in a concentrated winding motor. However, by forming the stator coil 7 with the electric conductor segments 45, it is possible to suppress increase in the size of the coil ends 38 of the stator coil 7.

While the above particular embodiments have been shown and described, it will be understood by those skilled in the art that various modifications, changes, and improvements may be made without departing from the spirit of the invention.

For example, in the previous embodiments, the motor 1 is configured as an inner rotor-type motor in which the rotor 3 is disposed radially inside of the stator 2. However, the invention can also be applied to an outer rotor-type motor in which a rotor is disposed radially outside of a stator.

Moreover, in the previous embodiments, the stator coil 7 is comprised of the first and second three-phase coils 27 and 28. However, the stator coil 7 may also be comprised of first and second m-phase coils, where m is 2 or any integer greater than 3.

In the previous embodiments, the rotor 3 is configured so that: for each of the magnet poles 10, the number of the slots 23 of the stator core 6 which face the magnet pole 10 is equal to 2m+1; for each of the consequent poles 11, the number of the slots 23 which face the consequent pole 11 is equal to 2m−1.

However, the rotor 3 may also be configured so that: for each of the magnet poles 10, the number of the slots 23 of the stator core 6 which face the magnet pole 10 is equal to 2m+n; for each of the consequent poles 11, the number of the slots 23 which face the consequent pole 11 is equal to 2m−n, where n is an integer greater than 1 and less than 2m.

What is claimed is:

1. A motor system comprising a motor and an inverter, wherein the motor includes a rotor and a stator that is disposed to face the rotor with a gap formed therebetween, the rotor includes a plurality of magnet poles, which have the same polarity at a periphery of the rotor facing the stator, and a plurality of consequent poles that have an opposite polarity to the magnet poles at the periphery of the rotor, each of the magnet poles is formed of at least one permanent magnet, and each of the consequent poles is formed of a soft magnetic material, the magnet poles are alternately arranged with the consequent poles in a circumferential direction of the rotor, the stator includes a stator core and a stator coil mounted on the stator core, the stator core has a plurality of slots that are formed in a surface of the stator core facing the rotor and arranged in a circumferential direction of the stator core at predetermined intervals, the stator coil is comprised of first and second m-phase coils that are electrically insulated from each other, where m is an integer greater than 1, the number of the slots of the stator core provided per circumferentially-adjacent pair of the magnet and consequent poles is equal to 4m, each of the first and second m-phase coils is comprised of m phase windings, the first and second m-phase coils are received in the slots of the stator core so that the phase windings of the first m-phase coil are alternately arranged with the phase windings of the second m-phase coil in the circumferential direction of the stator core, and the inverter energizes the first and second m-phase coils to cause them to respectively create first and second spatial magnetic fluxes in the gap between the rotor and the stator, and variation in a resultant spatial magnetic flux, which is the resultant of the first and second spatial magnetic fluxes, is less than variations in the first and second spatial magnetic fluxes in the circumferential direction of the rotor.

2. The motor system as set forth in claim 1, wherein the first and second m-phase coils are received in the slots of the stator core with a spatial phase difference therebetween, the inverter is comprised of first and second m-phase inverters, the first m-phase inverter supplies first m-phase alternating current to the first m-phase coil, and the second m-phase inverter supplies second m-phase alternating current to the second m-phase coil, and between the first and second m-phase alternating currents, there is provided a temporal phase difference that is equal in electrical angle to the spatial phase difference between the first and second m-phase coils.

3. The motor system as set forth in claim 2, wherein m is equal to 3, the spatial phase difference between the first and second three-phase coils is equal to 30° in electrical angle, and the temporal phase difference between the first and second three-phase alternating currents is also equal to 30° in electrical angle.

4. The motor system as set forth in claim 1, wherein for each of the magnet poles, the number of the slots of the stator core which face the magnet pole is greater than 2m, and for each of the consequent poles, the number of the slots of the stator core which face the consequent pole is less than 2m.

5. The motor system as set forth in claim 1, wherein the permanent magnets that form the magnet poles are disposed at the periphery of the rotor which faces the stator.

6. The motor system as set forth in claim 1, wherein the permanent magnets that form the magnet poles are disposed inside of the periphery of the rotor which faces the stator.

7. The motor system as set forth in claim 1, wherein each of the magnet poles has an angular width $\theta m$ and each of the consequent poles has an angular width $\theta c$, and the angular widths $\theta m$ and $\theta c$ are set based on the following relationship:

$$\theta m : \theta c = Bst : Br,$$

where Br is the residual magnetic flux density of the permanent magnets that form the magnet poles, and Bst is the saturation magnetic flux density of the soft magnetic material that forms the consequent poles.

8. The motor system as set forth in claim 1, wherein each of the phase windings of the first and second m-phase coils is formed of a plurality electric conductor segments, each of the electric conductor segments has a substantially U-shape to include a pair of leg portions and a turn portion that connects the leg portions, and each corresponding pair of distal ends of the leg portions of the electric conductor segments are joined together.

* * * * *